United States Patent [19]
Kohn et al.

[11] Patent Number: 6,006,312
[45] Date of Patent: Dec. 21, 1999

[54] CACHABILITY ATTRIBUTES OF VIRTUAL ADDRESSES FOR OPTIMIZING PERFORMANCE OF VIRTUALLY AND PHYSICALLY INDEXED CACHES IN MAINTAINING MULTIPLY ALIASED PHYSICAL ADDRESSES

[75] Inventors: Leslie Kohn, Fremont; Ken Okin, Saratoga; Dale Greenley, Los Gatos, all of Calif.

[73] Assignee: Sun Microsystems, Inc., Palo Alto, Calif.

[21] Appl. No.: 08/391,389

[22] Filed: Feb. 27, 1995

[51] Int. Cl.$^6$ .................................................. G06F 12/00
[52] U.S. Cl. ........................... 711/210; 711/202; 711/206; 711/207; 711/122; 711/145; 711/146; 711/156; 711/3
[58] Field of Search ...................................... 395/420, 415, 395/417, 449, 471, 472; 711/210, 205, 207, 122, 144, 145, 206, 202, 156, 3

[56] References Cited

U.S. PATENT DOCUMENTS

| | | | |
|---|---|---|---|
| 3,723,976 | 3/1973 | Alvarez et al. | 711/207 |
| 4,136,385 | 1/1979 | Gannon et al. | 711/207 |
| 4,332,010 | 5/1982 | Messina et al. | 711/3 |
| 4,400,770 | 8/1983 | Chan et al. | 711/3 |
| 4,488,256 | 12/1984 | Zolonwsky et al. | 711/210 |
| 4,727,482 | 2/1988 | Roshon-Larsen et al. | 711/202 |
| 4,785,398 | 11/1988 | Joyce et al. | 711/3 |
| 4,885,680 | 12/1989 | Anthony et al. | 711/144 |
| 5,003,459 | 3/1991 | Ramanujan et al. | 711/3 |
| 5,109,335 | 4/1992 | Watanabe | 711/3 |
| 5,113,514 | 5/1992 | Albonesi et al. | 711/144 |
| 5,119,290 | 6/1992 | Loo et al. | 711/210 |
| 5,133,058 | 7/1992 | Jensen | 711/207 |
| 5,226,133 | 7/1993 | Taylor et al. | 711/207 |
| 5,257,361 | 10/1993 | Doi et al. | 711/207 |
| 5,307,477 | 4/1994 | Taylor et al. | 711/3 |
| 5,361,340 | 11/1994 | Kelly et al. | 711/3 |
| 5,369,753 | 11/1994 | Tipley | 711/122 |
| 5,392,410 | 2/1995 | Liu | 711/3 |

(List continued on next page.)

OTHER PUBLICATIONS

Kohn, L., et al., "Introducing the Intel i860 64–Bit Microprocessor", IEEE Micro, vol. 9, No. 4, pp. 15–30 (Aug. 1989).

(List continued on next page.)

*Primary Examiner*—Eddie P. Chan
*Assistant Examiner*—Hong Kim

[57] ABSTRACT

A separate cacheable-in-virtual-cache attribute bit (CV) is maintained for each page of memory in the translation table maintained by the operating system. The CV bit indicates whether the memory addresses on the page to which the translation table entry refers are cacheable in virtually indexed caches. According to a first embodiment, when there are two or more aliases which are not offset by multiples of the virtual cache size, all of the aliases are made non-cacheable in virtually indexed caches by deasserting the CV bits for all aliases. With regards to the contents of the translation lookaside buffer (TLB), the translations for all aliases may simultaneously coexist in the TLB because no software intervention is required to insure data coherency between the aliases. According to second and third embodiments of the present invention, when there are two or more aliases which are not offset by multiples of the virtual cache size, only one of those aliases may remain cacheable in virtual caches. For the other aliases, the CV bits for the translation pages containing those aliases are deasserted. The operating system has the responsibility of flushing data from the virtually indexed internal cache before deasserting the CV attribute for a page. The second embodiment allows the newer mapping to a physical address to remain in the first-level cache, while the third embodiment allows the older alias to remain in the first-level cache when a newer alias is mapped.

8 Claims, 6 Drawing Sheets

U.S. PATENT DOCUMENTS

| | | | |
|---|---|---|---|
| 5,412,787 | 5/1995 | Forsyth et al. | 711/207 |
| 5,479,630 | 12/1995 | Killian | 711/3 |
| 5,487,162 | 1/1996 | Tanaka et al. | 711/145 |
| 5,502,829 | 3/1996 | Sachs | 711/207 |
| 5,550,995 | 8/1996 | Barrera et al. | 711/3 |
| 5,564,052 | 10/1996 | Nguyen et al. | 395/800.42 |
| 5,606,687 | 2/1997 | Mehring et al. | 711/139 |
| 5,668,968 | 9/1997 | Wu | 711/3 |
| 5,668,972 | 9/1997 | Liu et al. | 711/136 |
| 5,675,763 | 10/1997 | Mogul | 711/135 |
| 5,699,551 | 12/1997 | Taylor et al. | 711/207 |

OTHER PUBLICATIONS

Cheng, R., "Virtual Address Cache In Unix", Proceedings of the Summer 1987 USINIX Conference, 8–12, pp. 217–224, (Jun. 1987).

Wheeler, B., et al., "Consistency Management for Virtual Indexed Caches", ACM SIGPLAN Notices, vol. 27, No. 9, pp. 124–136, (Sep. 1992).

Kohn et al., "Cachability Attributes for Virtual Addresses in Virtually and Physically Indexed Caches", EP 729102 Search Report, Aug. 28, 1996.

TRANSLATION LOOKASIDE BUFFER

CACHABILITY ATTRIBUTES OF VIRTUAL ADDRESSES FOR OPTIMIZING PERFORMANCE OF VIRTUALLY AND PHYSICALLY INDEXED CACHES IN MAINTAINING MULTIPLY ALIASED PHYSICAL ADDRESSES

BACKGROUND OF THE INVENTION

1. Field of the Invention

The present invention relates to processors having multi-level memory systems, and specifically to aliasing in the presence of virtually-indexed caches.

2. Discussion of the Prior Art

Using multi-level memory systems is a general technique for exploiting locality of reference. The basic idea is to organize a small amount of fast access memory and a large amount of slower access memory so that most of the accesses go to the small, fast memory. The average access time of such a memory system may be only slightly greater than that of the small, fast memory, while its effective size is that of the large memory.

A common form of multi-level memory system is cache memory, or lookaside buffer memory. As illustrated in FIG. 1, a cache memory 10 is a relatively small, specialized memory device placed between the processor 11 and main memory 12. The cache memory 10 holds copies of words from main memory 12 that are likely to be accessed by the processor. The cache 10 is faster than main memory 12; thus if frequently accessed locations are found in the cache 10, the cache hit rate will be high and the average memory access time will be small. The strategy followed by the cache 10 is to hold words located near other words recently used by the processor. The locality of reference exploited by this strategy is the propensity of memory accesses, over short periods of time, to cluster in small regions of memory.

Cache memory locations are redundant, in the sense that each is used to provide a more accessible copy of information also stored in slower main memory 12. Thus the total addressable memory size, as seen by the programmer, is not increased by the presence of a cache 10. Rather, the cache 10 provides, in a program transparent way, an improvement in the average access time to locations in the same address space.

As the cache 10 is much smaller than main memory 12, only a minority of the main memory locations can be cached at any one time. Consequently, in the general case each location in the cache 10, or cache line, conceptually has two parts—a tag field and a contents field. When a read or write operation is requested, the desired address is compared with the tag field of certain lines of the cache. If a match is found, the contents field of the cache line containing the matching tag is read or written. This is known as a cache hit, and there is no need to access main memory.

Modern processors support virtual address space, which is conceptually distinct from physical address space. A virtual address is a label that the processor uses to specify a memory location. The processor is not concerned with where that memory location actually resides in the physical memory, so long as the processor is able to access the location with the virtual address. A processor architecture specification defines a certain virtual address space which must be supported. The operating system that manages the computer system has flexibility as to how that virtual address space is mapped to physical memory. Thus, there is a translation that must occur from virtual to physical address.

FIG. 2 illustrates a typical virtual to physical translation. Both virtual and physical memory is conceptually separated into pages. The virtual address 20 of a memory location, for instance, consists of a virtual page number 21 and a page offset index 22. The virtual page number 21 indicates on which page of memory the specified memory location resides. The page offset index 22 represents where the desired memory location is within the boundaries of its page. Thus, the page offset index 22 dictates the location relative to the beginning of the page. Physical addresses are also constructed in the same fashion. A physical page number 23 and a page offset index 24 define a physical memory address 25. By convention, most implementations of a virtual address space happen to index memory within each page in the same manner for the virtual and physical addresses. Thus, the page offset indexes 22 and 24 are the same for the virtual address 20 and corresponding physical address 25 of a memory location. Therefore, if the page size is $2^p$, the low order p bits of the virtual and corresponding physical address of a memory location are equal and represent the page offset index.

In the process of translating from a virtual address 20 to a physical address 23, since the virtual page offset 22 is the same as the physical page offset 24, the page offset portion of the virtual address does not need translation. However, the physical page number 23 is not the same as the virtual page number 21, and thus the virtual page number 21 must be translated. A memory management unit 26, which typically is implemented in a combination of hardware (translation lookaside buffers) and software (table walking), performs this virtual to physical page translation.

FIG. 3 illustrates the operation of a non-associative or direct mapped cache. The direct mapped cache uses the low-order bits 30 of the incoming memory address 31 to dictate the address within the cache to examine for a hit. Thus, a memory location A can only reside in the cache line whose address within the cache is represented by the low k bits 30 of the address of A. While constraining a memory address 31 to be cached in only one specific line within the cache is a serious limitation, it allows the use of cheaper and denser standard Random Access Memory (RAM) rather than associative memory. The constraint implies, however, that memory locations which share the same k low-order address bits 30 also share the same cache line. If each cache line only provides for the storage of the contents of one memory location, then two memory locations with the same low order k address bits 30 cannot be cached simultaneously, since they contend for the same cache line. Another important and attractive characteristic of a direct-mapped cache is that it tends to operate faster given that it is simpler and require less circuitry.

Most processor architecture specifications support aliases among the virtual addresses. Two virtual addresses which refer to the same physical address are aliases of each other. The low order p bits of the virtual address of any given memory location represent the page offset from the beginning of the virtual page. The page offset index for any given virtual address is equal to the page offset index of the physical address. Therefore, if two addresses are aliases of each other, their low order p bits must be equal, since they both refer to the same physical address. However, the bits which represent the virtual page numbers of the two aliases are different.

For the purposes of this discussion, the possible cache organizations are: virtually or physically indexed, virtually or physically tagged, and direct-mapped or set-associative. In a processor which supports virtual addresses, some of the caches in that processor may be virtually indexed direct mapped caches, while other caches are physically indexed direct mapped caches. A virtually indexed direct mapped cache uses the virtual address to provide the cache line mapping, while a physically indexed direct mapped cache uses the physical address to provide the cache line mapping. Thus, in a virtually indexed cache, if the number of cache lines is $2^k$, then the low order k bits of the virtual address are used to map to the cache line for that virtual address.

If the number of cache locations is equal to or smaller than the number of locations in a page, there is no distinction between a virtually indexed and a physically indexed cache, since the low order p bits of the physical address and its corresponding virtual address are the same. In that case, when k is less than or equal to p, all aliases will map to the same cache line, since the low order k bits used to map to the cache line are all equal. However, if the cache size is larger than $2^p$, the virtually indexed caches and physically indexed caches will produce different cache line mappings for the same memory location, since some of the virtual page bits or physical page bits are used to derive the cache line. Moreover, in a virtually indexed cache, aliases may map to different cache lines within the same cache. In a virtually indexed cache when the page size is less than the cache size, one or more of the virtual page bits are used to provide the cache line mapping. Since the virtual pages of the aliases are different, the virtual page bits of the virtual addresses are different. Thus, the cache lines may be different, since one or more of the low order virtual page number bits must be used to map into a cache line.

For example, if a virtually indexed cache has $2^{14}$ lines, and the physical page size is only $2^{12}$, then any given physical memory location could have as many as four aliases which all mapped to different cache lines. This is a consequence of the fact that two of the virtual page number bits must be used to provide the mapping into the cache. Since there are four possible values which could be represented by the two bits, the aliases could map to any of four different locations depending upon their low order two virtual page number bits.

When two or more virtual addresses map to the same physical address, data written to one of those virtual addresses should be visible upon subsequently reading from any of the aliases. If all the aliases map to the same cache lines, virtually indexed caches behave as expected. Data written to any one of the aliases will be written to the same cache line. However, significant data inconsistency problems occur if the aliases map to the different cache lines. If two virtual aliases map to different cache lines of a virtually addressed cache, each alias behaves as if it were its own independent variable. For example, if X and Y are virtual address aliases, and if a store to X is performed, that data would not be visible during a subsequent read of Y if Y were also resident in the cache. Furthermore, the value in Y remains unchanged by the write to X, whereas it should have been destroyed. When X and Y are removed from the cache, each will be written into the physical memory location to which they both refer. Assuming that the cache was a write back cache (rather than write through), the value which exists in the physical main memory after both X and Y are removed from the cache will depend upon which virtual address was removed from the cache last. Thus, if Y is removed last, the data written to X is destroyed while the stale data at Y incorrectly occupies the physical location in main memory.

In order to maintain data consistency, one prior art approach required that all of the virtual aliases be made non-cacheable; not even one of the aliases could remain in a cache. A serious performance degradation results from this prior art approach, since any references to any of the aliases cannot derive any benefit from the first-level or second-level caches, and must access main memory, which is the slowest level of memory.

FIG. 4 shows the structure of the cache and address translation mechanisms. The operating system maintains translation information in an arbitrary data structure, called the software translation table 40. Translation lookaside buffers provide quick hardware translations, and are essentially caches of the large and complex software translation table. For each cache, a translation lookaside buffer (TLB) 41 exists which acts as an independent cache of the software translation table 40. For more frequently accessed virtual pages, the TLB provides a one-cycle translation. The term "TLB hit" means that the desired translation is present in the on-chip TLB. The term "TLB miss" means that the desired translation is not present in the on-chip TLB.

On a TLB miss the memory management unit immediately traps to software for TLB miss processing. The TLB miss handler software routine has the option of filling the TLB by any means available. Some memory management units include an intermediate translation device, such as the translation storage buffer 42 shown in FIG. 4. The translation storage buffer acts like a second-level cache of address translations. While the TLBs are small and fast, the software translation table is likely to be large and complex. Thus, when the TLB miss handler operating system software routine is invoked after a TLB miss, a significant number of cycles may occur before the virtual to physical translation can be retrieved and processing can continue.

A second prior art approach involves allowing one virtual alias to stay in the caches, but requiring the others to be excluded from caches and from the TLB. Allowing one alias to remain cacheable offers some benefits over the previous approach of making all aliases non-cacheable. If one alias remains cacheable, then repeated accesses to that alias still derive benefit from the quickness of the cache and TLB entry for that address.

For example, if X and Y are aliases, X can remain in the cache and its translation can remain in the TLB. However, Y must be made non-cacheable. If X is referenced repeatedly without any references to Y, then some benefit of the cache is retained. However, when Y is referenced, a TLB miss will occur. To insure correct operation, before putting Y into the cache or including Y's translation in the TLB, the operating system must remove X from the cache and remove X's translation from the TLB. If X's translation were not removed from the TLB, no TLB miss would occur the next time a reference to X occurred. When X was again referenced, without software intervention, it would again be entered in the cache, unacceptably coexistent with Y.

The concept of cacheable address attributes is known in the prior art. A cacheable address attribute is a logical designation associated with a portion of memory which indicates whether data from that portion of memory can or cannot be placed into a cache. Cacheable address attributes are typically used to disallow the caching of memory mapped input or output locations. Most processor architectures support interfaces with input/output devices as being mapped to a certain part of the physical address space. For example, the mouse in a computer system may be mapped to a certain memory location. To keep up with what is happening with the mouse, the processor will periodically read from the address to which the mouse is mapped as if it were just another memory location. Similarly, when the processor wants to write data to a disk drive, for example, it writes to a special memory location dedicated to that output device. Caching those input/output locations is not permitted. A write to the output device is intended to reach the output terminals, not merely an internal cache which is only accessible to the processor. Similarly, a read from an input device is intended to read from the input device itself, not merely a cached version of what previously had been existent on the terminals of the input device.

An important problem with the approach of making aliases which violate the alias restriction non-cacheable is the possibility of having to deal with non-cacheable accesses to main memory. These accesses complicate many specialized instructions, such as "compare and swap" (CAS) and "partial store" (PST). It is very difficult to make these instructions work properly if they have to access non-cacheable main memory. Hence, there is a great benefit in developing a strategy where main memory can always be cacheable at least in physically indexed caches. The performance benefits which result from such a strategy, are additional added incentives.

SUMMARY OF THE INVENTION

A cacheable address attribute indicates whether or not the data from a particular page of memory can s be placed into a cache. With virtually indexed caches, it is possible that two virtual address aliases may map to different cache lines. As a consequence, stores to one alias may not affect the data cached for the other alias. In order to force all aliases to map to the same cache line of a virtually indexed cache, the operating system tries to offset virtual address aliases by a multiple of the virtual cache size. If this can be guaranteed, then all aliases will map to the same cache line. However, there are cases in which the operating system cannot offset aliases by a multiple of the virtual cache size.

According to the present invention, a separate cacheable-in-virtual-cache attribute bit (CV) is maintained for each page of memory in the translation table maintained by the operating system. The CV bit indicates whether the memory addresses on the page to which the translation table entry refers are cacheable in virtually indexed caches.

According to a first embodiment of the present invention, when there are two or more aliases which are not offset by multiples of the virtual cache size, all of the aliases are made non-cacheable in virtually indexed caches by deasserting the CV bits for all aliases.

With regards to the contents of the translation lookaside buffer (TLB), the translations for all aliases may simultaneously coexist in the TLB. A TLB miss causes a trap to software to occur. Because no software intervention is required to insure data coherency between the aliases according to the present invention, several mappings to the same physical page can simultaneously exist in the TLB.

According to a second and third embodiment of the present invention, when there are two or more aliases which are not offset by multiples of the virtual cache size, only one of those aliases may remain cacheable in virtual caches. For the other aliases, the cacheable-in-virtually-indexed-cache (CV) bits for the translation pages containing those aliases are deasserted. The operating system has the responsibility of flushing data from the virtually-index internal cache before deasserting the CV attribute for a page. The second embodiment of the present invention allows the newer mapping to a physical address to remain in the first-level cache. A third embodiment of the present invention allows the older alias to remain in the first-level cache when a newer alias is mapped.

DETAILED DESCRIPTION OF THE INVENTION

A cacheable address attribute indicates whether or not the data from a particular page of memory can be placed into a cache. In the prior art, cacheable address attributes were used to prevent memory mapped input and output locations from being cached. With virtually indexed caches, it is possible that two virtual address aliases may map to different cache lines. As a consequence, stores to one alias may not affect the data cached for the other alias.

Figure 1:
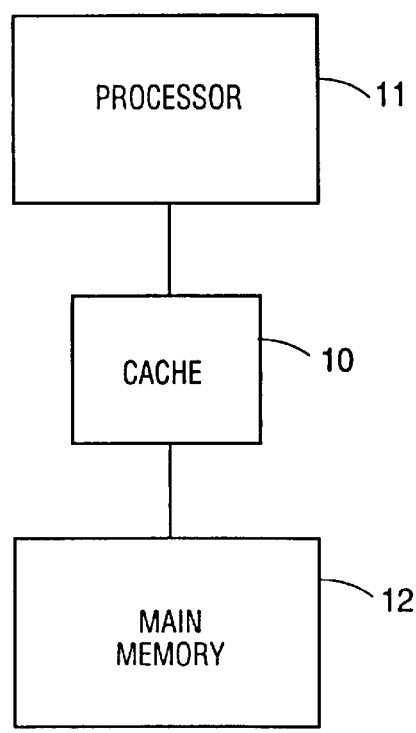
FIG. 1 is a simplified block diagram showing the relationship between a processor, cache, and main memory.
Figure 2:
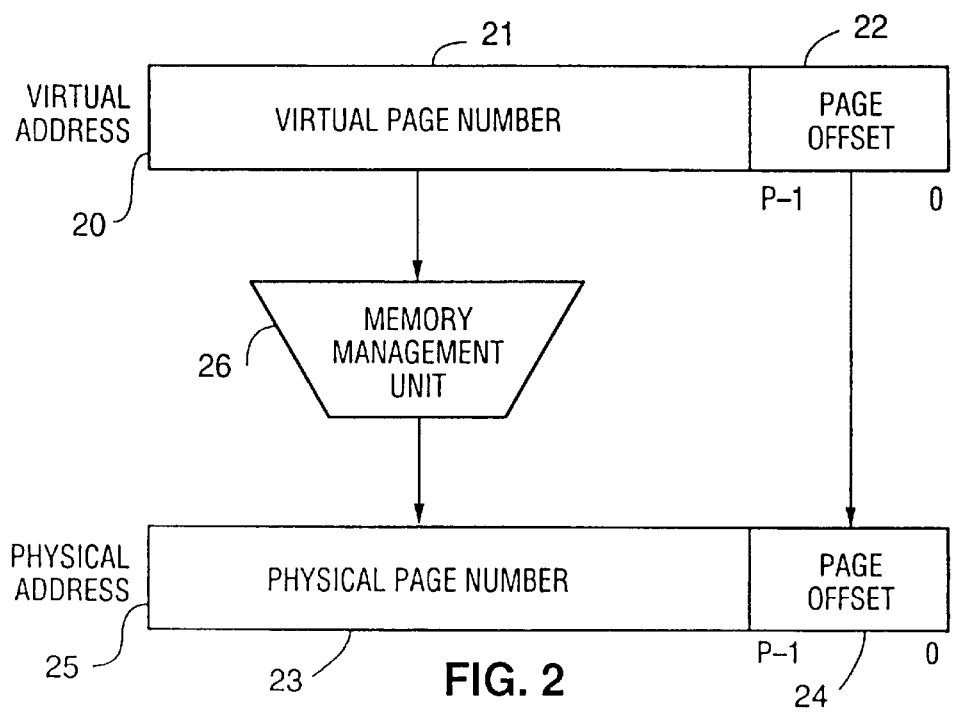
FIG. 2 illustrates the translation from a virtual address to its corresponding physical address.
Figure 3:
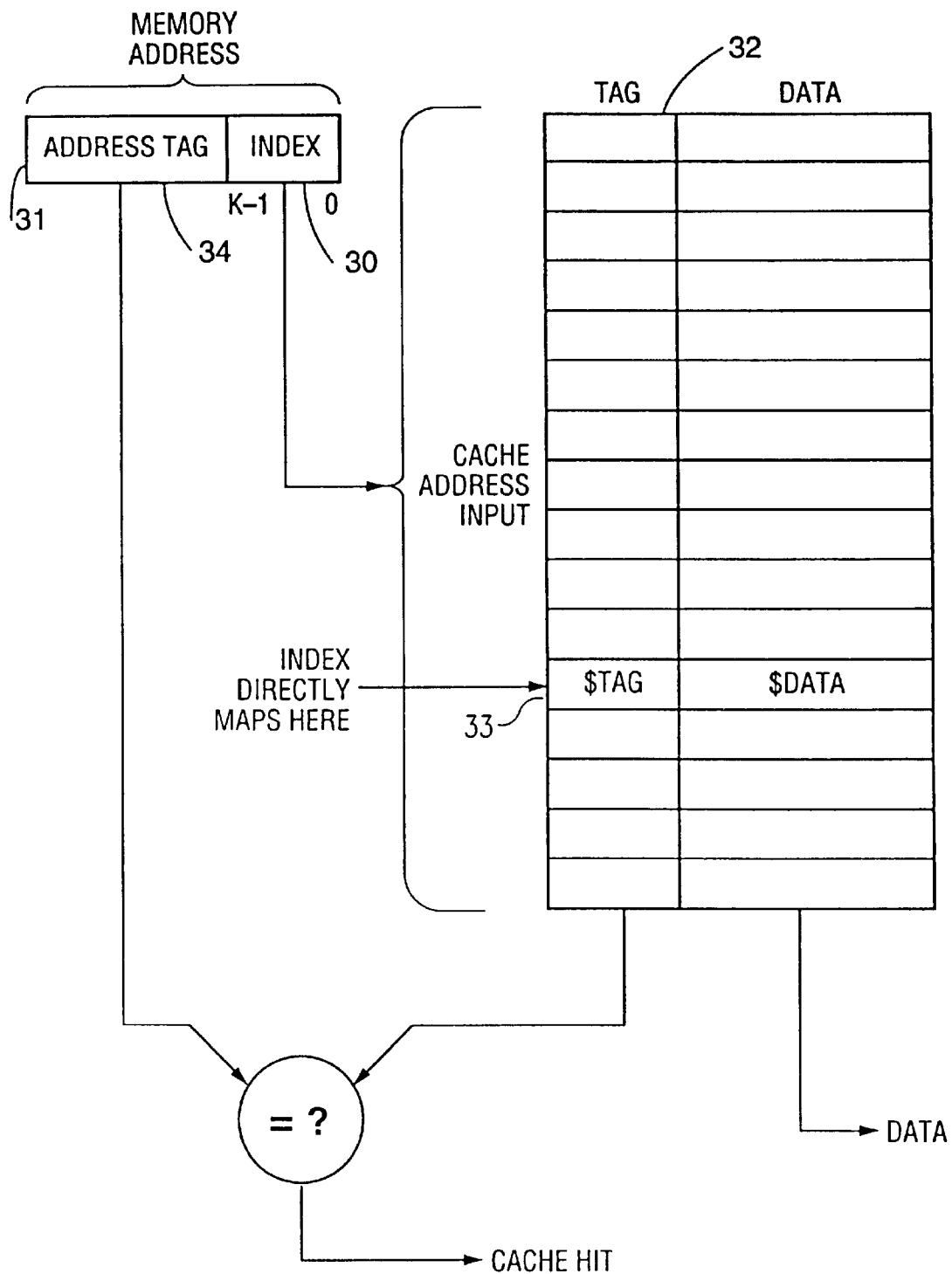
FIG. 3 illustrates the operation of a direct mapped cache.

FIG. 3 shows the operation of a direct mapped cache. When searching the cache for a specific memory address, the low order address bits 30 are used to provide a cache line mapping. The tag 32 at the cache line 33 specified by the low order address bits 30 is compared to the upper order address bits 34 of the memory address 31 desired. If the tag 32 and the upper order bits 34 of the desired address 31 match, a cache hit occurs. In a virtually indexed cache, either the virtual address or the physical address is truncated to create the tag 32. If the virtual address produces the tag 32, the cache is virtually tagged; if the physical address determines the tag 32, the cache is physically tagged.

In order to force all aliases to map to the same cache line of a virtually indexed cache, the operating system tries to offset virtual address aliases by a multiple of the virtual cache size. If this can be guaranteed, then all aliases will map to the same cache line. In a virtually indexed, physically tagged cache, if all aliases map to the same cache line, then all the aliases will be automatically updated in the cache whenever a store to any one of those aliases occurs. Because all aliases have the same physical address, the physical tags for all aliases are equal; thus, if the aliases map to the same cache line, a cache hit will occur for any of the aliases so long as one of them is cached.

On the other hand, if the virtually indexed cache is also virtually tagged, offsetting virtual address aliases by a multiple of the virtual cache size will also prevent the data inconsistency problem. The tags of all aliases will be different, thus if one of the aliases is cached, any reference to any of the other aliases will result in a cache miss. The previously cached location will be written back to memory, and the presently desired alias will be placed in the cache line. Because only one line exists for all of the aliases, no two can separately exist in the cache. Thus, in a virtually indexed, virtually tagged cache organization, two aliases X and Y, though touching the same cache line if the alias rule is obeyed, do not see each other as cache hits. That is, since the tags are virtual, there is no particularly easy way to tell that X equals Y. Handling this organization properly tends to be very complex and often requires a duplicate set of cache tags that is based on physical addresses.

Unfortunately, there are cases in which the operating system cannot offset aliases by a multiple of the virtual cache size. In prior art systems, this would cause errors in virtually indexed caches, since the two aliases would map to different cache lines. Stores to one aliases would not be updated in the other alias if the other alias was also cached.

Figure 5:
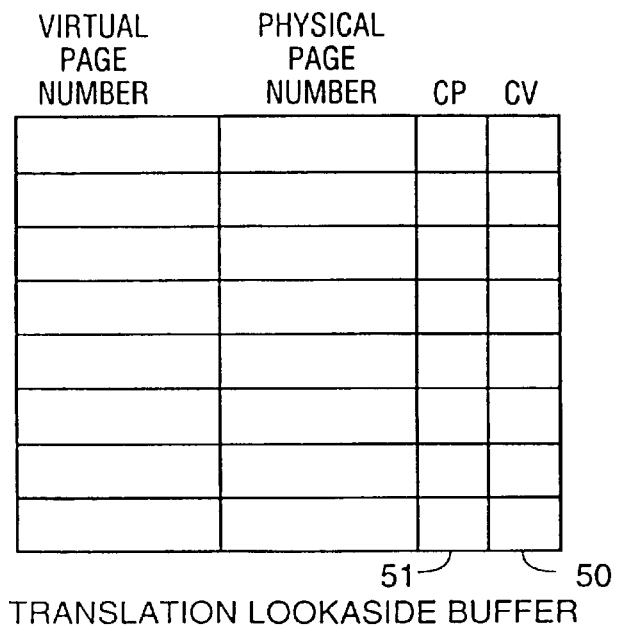
FIG. 5 is a simplified illustration of a small translation lookaside buffer according to the present invention.

According to the present invention, a separate cacheable-in-virtual-cache attribute bit (CV) 50 in FIG. 5 is maintained for each page of memory in the translation table maintained by the operating system. FIG. 5 illustrates a small translation lookaside buffer. The CV bit 50 indicates whether the memory addresses on the page to which the translation table entry refers are cacheable in virtually indexed caches. The CV bit set to one indicates the memory address on the page to which the translation table entry refers is cacheable in virtually indexed caches. The CV bit set to zero indicates the memory address on the page to which the translation table entry refers is not cacheable in virtually indexed caches. Additionally, as in prior art systems, a cacheable-in-physical-caches attribute bit (CP) 51 is maintained for each page. The CP bit indicates whether or not the data from that page is cacheable in any type of cache, regardless of whether the cache is virtually or physically indexed. The CP bit set to one indicates the memory address on the page to which the translation table entry refers is cacheable in physically indexed caches and, depending on the CV bit, could be cacheable in virtually indexed caches. The CP bit set to zero indicates the memory address on the page to which the translation table entry refers is not cacheable in either virtually or physically indexed caches.

Figure 4:
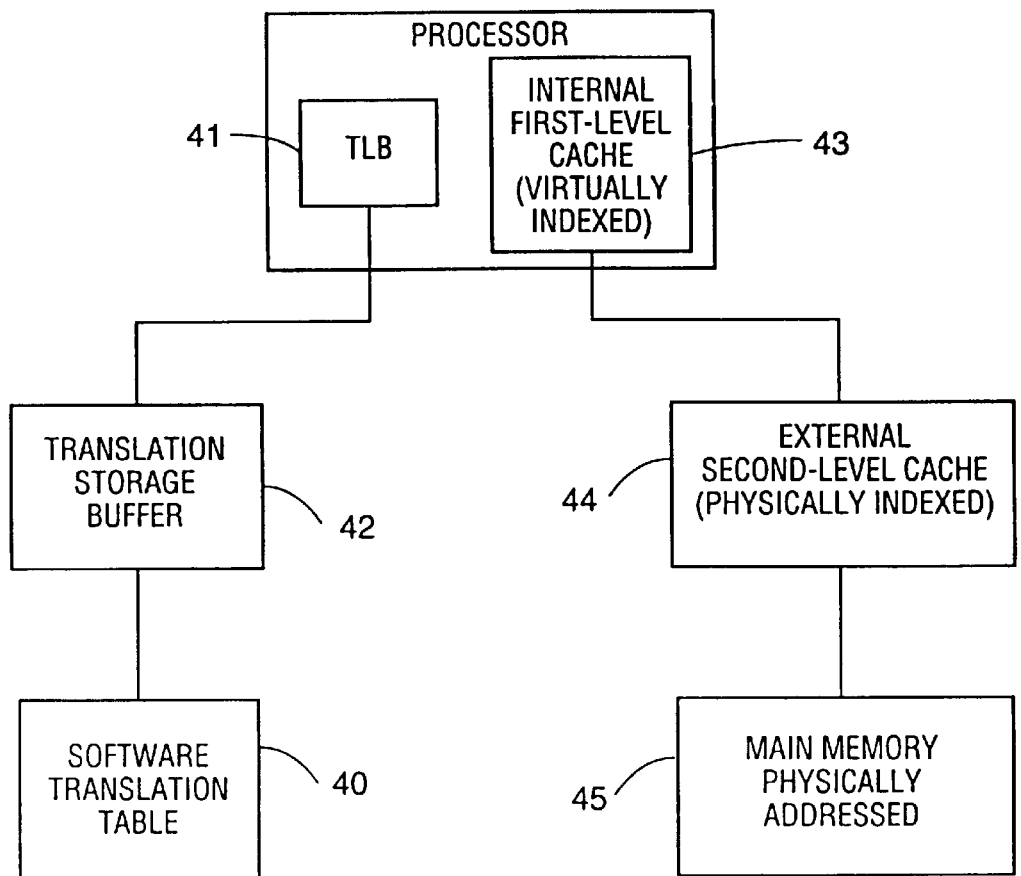
FIG. 4 is a simplified block diagram showing the location and organizations of the memory structure and the address translation table structure according to the prior art and the embodiments of the present invention.

According to a first embodiment of the present invention, when there are two or more aliases which are not offset by multiples of the virtual cache size, all of the aliases are made non-cacheable in virtually indexed caches. FIG. 4 includes a simplified block diagram of a typical cache structure. A small internal cache 43 is virtually indexed. A larger external cache 44 is physically indexed. By disallowing caching of the aliases in the virtually indexed internal cache 43, data inconsistency problems are avoided. Each of the aliases map to the same physical address; therefore, each of the aliases also will map to the same cache line of the physically indexed external cache 44. If the external cache 44 is also physically tagged, references to any of the multiple aliases of a given physical address will produce external cache hits if the physical address is cached in the external cache 44. If the external cache 44 is virtually tagged and one of the multiple aliases has been cached, references to any of the other aliases will always produce external cache misses because the virtual tags will necessarily be different for each of the aliases. In any case, the data inconsistency problem is cured since no two cache lines hold data which is mapped to the same physical address.

The operating system software maintains translation information in the software translation table 40. The operating system maintains the cachability attributes for pages of memory. Thus, each page has a cacheable-in-physically-indexed-cache attribute (CP) and a cacheable-in-virtually-indexed-cache attribute (CV). Every page has many individual memory locations. If p bits are required to specify the page offset in an address, then each page may have as many as $2^p$ locations. If two virtual pages map to the same physical page, each of the addresses within the two virtual pages has one alias on the other page. Thus, aliasing is performed on a page by page basis. If two virtual pages are aliases, both entire pages' CV attributes are deasserted. If some of the data from a page exists in the virtual cache prior to the operating system's mapping which violates the offset rule, then it is the operating system's responsibility to flush such data from the virtual cache before rendering the page non-cacheable in the virtual cache.

It is common that the internal cache 43 is a write through cache, at least to the external cache level 44. Thus, data which is written into the internal cache 43 is also written into the external cache 44. The external cache 44 therefore contains up-to-date copies of everything in the internal cache 43. When the cachability attributes of a page are altered such that a virtual page no longer is cacheable in virtually indexed caches (CV=0), the data flushed from the virtually indexed internal cache 43 has no adverse effects on data integrity since the same data is still available in the physically indexed external cache 44.

According to the present invention with regards to the contents of the translation lookaside buffer (TLB) 41, all aliases may simultaneously coexist in the TLB 41. A TLB miss causes a trap to software to occur. Prior art methods removed entries from the TLB 41 specifically to cause a trap to software, because without software intervention, the hardware could possibly execute incorrectly. Because no software intervention is required to insure data coherency between the aliases according to this embodiment of the present invention, several mappings to the same physical page can simultaneously exist in the TLB 41. This provides a great advantage of the present invention. Because several aliases' virtual to physical address translations can simultaneously exist in the TLB 41, the TLB miss handler software is not invoked upon reference to any of the aliases, provided they are in the TLB 41. Thus, the average access time for memory references to any of the aliases is kept relatively low in comparison to the access time required if the TLB miss handler is repeatedly invoked each time an alias is accessed. Furthermore, since the desired data for any alias will be available in the physically indexed second-level cache 44, the long delays necessary to access the slow main memory 45 are not incurred.

Figure 6:
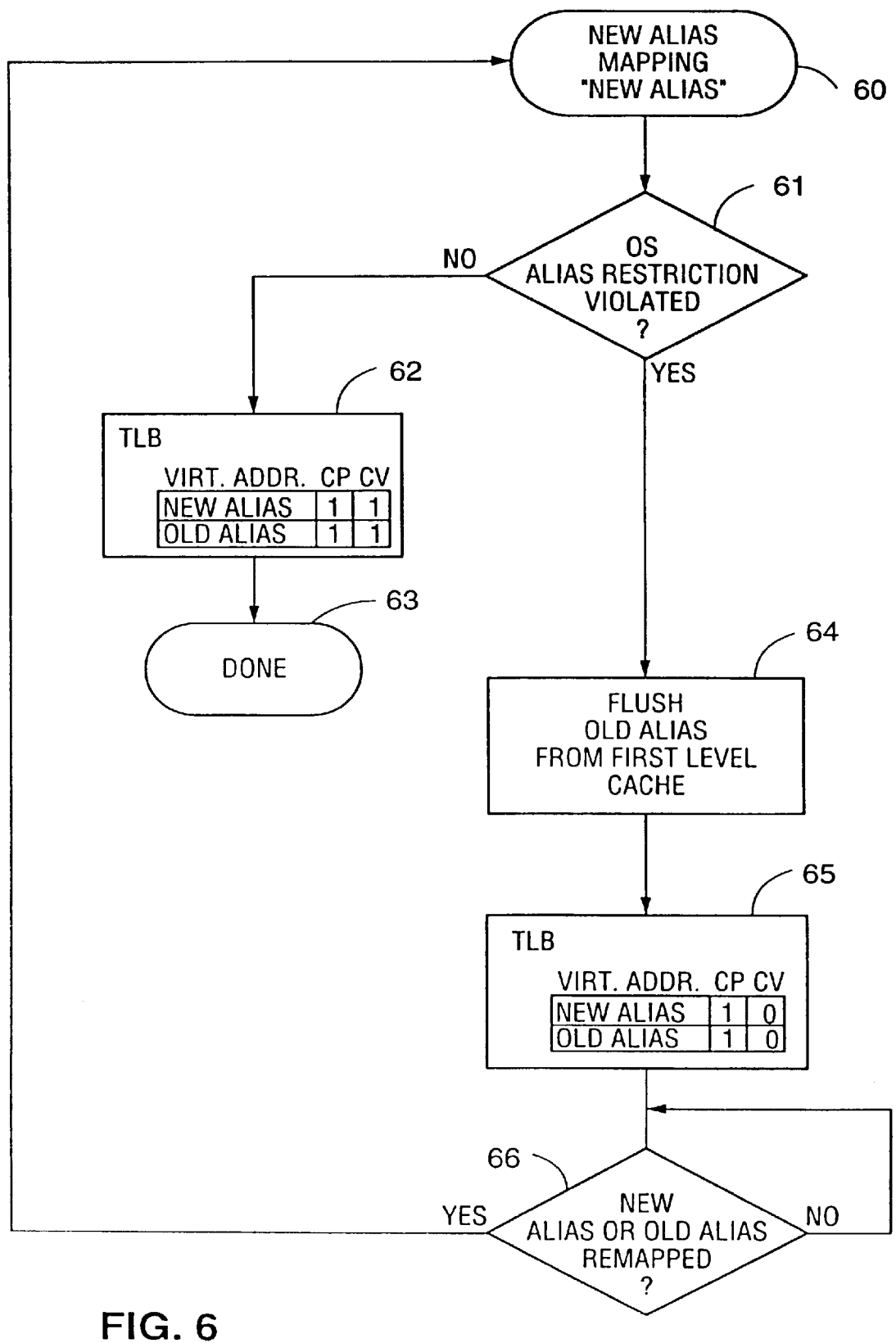
FIG. 6 is a flowchart illustrating the activities of a operating system software routine according to the first embodiment of the present invention.

FIG. 6 illustrates the operating system responsibilities according to the first embodiment of the present invention. Whenever a new virtual to physical address alias mapping (NEWALIAS in FIG. 6) is added to the software translation table, the operating system software begins at step 60. At test 61, the operating system determines whether the alias restriction guideline, prescribing that aliases be offset by a multiple of the virtually indexed cache size, has been violated. If the aliases are properly offset, in step 62 the operating system asserts the CV bit and the CP bit for both aliases in the TLB and the software translation table, and the operating system's work is finished at step 63. However, if the aliases restriction is violated, in step 64 the operating system flushes or removes the previously existing alias (OLDALIAS in FIG. 6) from the first-level virtually indexed cache 43 in FIG. 4. In step 65, the CV attribute bit for both aliases are deasserted in the TLB 41 while the CP attribute bit for both aliases remains asserted. Because the CP bit is asserted, both aliases are cacheable (in the same line) in the second-level physically-indexed cache 44. After step 65, the processor can operate without software intervention until one of the aliases is re-mapped. At test 66, the operating system keeps track of when one of the aliases is re-mapped to a different virtual address or is removed from the virtual address space. When one of the mappings changes, the software routine is restarted at step 60.

According to a second embodiment of the present invention, when there are two or more aliases which are not offset by multiples of the virtual cache size, only one of those aliases may remain cacheable in virtual caches. For the other aliases, the cacheable-in-virtually-indexed-cache (CV) bits for the translation pages of those aliases are deasserted. The operating system has the responsibility of flushing data from the virtually-index internal cache 43 before deasserting the CV attribute for a page.

In this embodiment, the operating system has one responsibility above and beyond its normal duties. Consider the case where X and Y are virtual addresses and aliases, thus they map to the same physical address. Assume that the operating system guideline that aliases be offset by a multiple of the virtually-indexed cache size cannot be followed for some reason. X is allowed to remain in the virtually-indexed cache. The TLB mapping for Y is changed by deasserting the CV bit for Y's translation table entry so that Y is not cacheable in virtual caches. Thus, X is in the virtually indexed cache 43, while Y is relegated to the physically indexed external cache 44. Now a store to Y occurs. Subsequently, a load from X is performed. Since X and Y really refer to the same memory variable, the load from X in the virtually indexed cache 43 should return the data stored to Y in the physically indexed second-level cache 44. However, there is no hardware mechanism which causes the first-level cache to be updated with the information from the second-level cache 44. Thus, the operating system has the responsibility to make sure that this does not occur. The benefit that is gained by adding this operating system complexity is that accesses to X retain the benefit of fast first-level cache availability.

Figure 7:
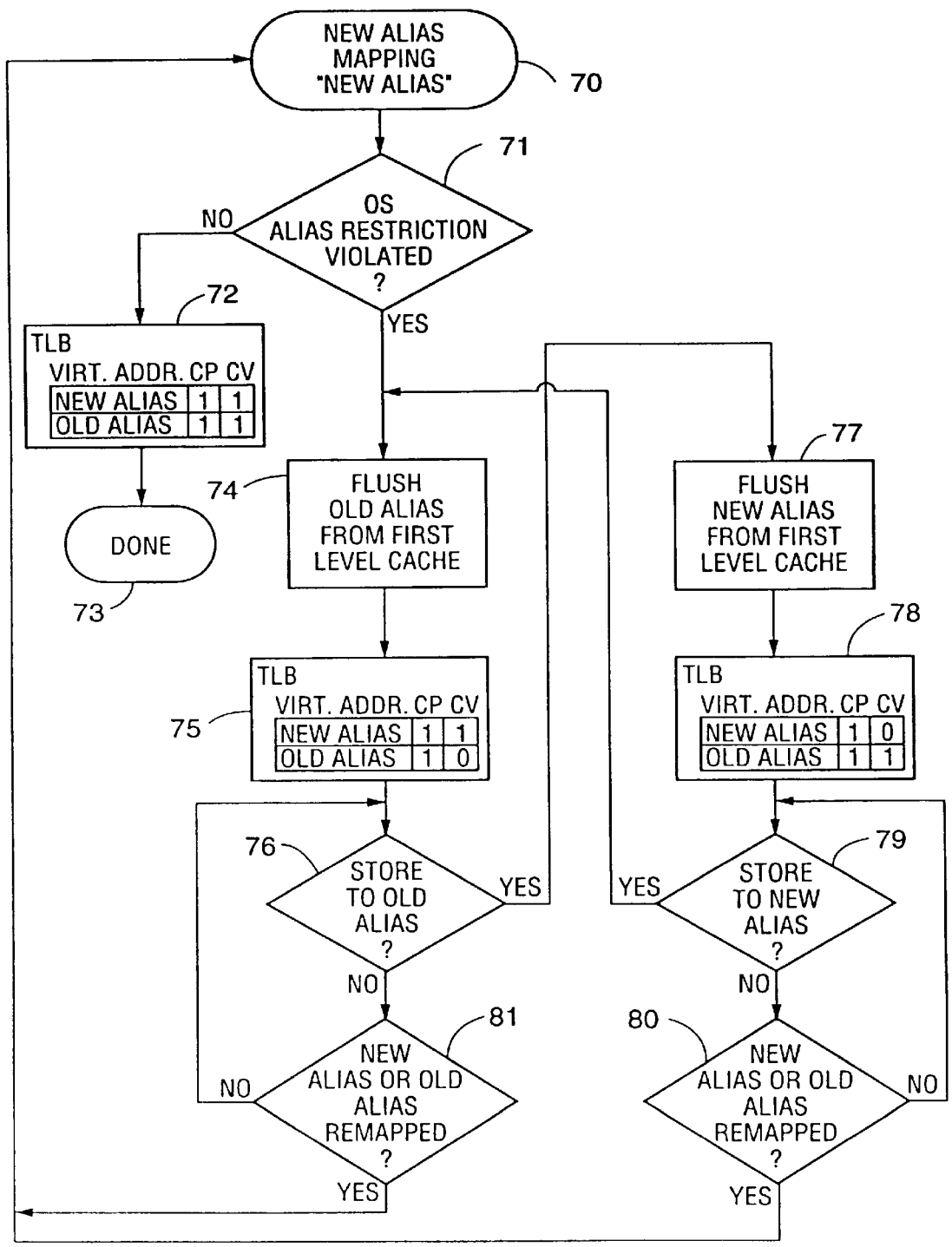
FIG. 7 is a flowchart illustrating the activities of a operating system software routine according to the second embodiment of the present invention.

According to the second embodiment of the present invention, the latest mapping to a physical address is allowed to remain in the first-level cache. This requires the flushing of the older alias from the first-level cache. FIG. 7 illustrates the responsibilities of the operating system according to the second embodiment of the present invention. When the operating system maps a new alias (NEWALIAS in FIG. 7), the software routine is invoked at step 70. Test 71 determines whether the guideline that all aliases be offset by a multiple of the virtually indexed internal cache size is violated. If the guidelines has been obeyed, both the OLDALIAS and the NEWALIAS remain cacheable in virtually indexed caches. Thus, in step 72, the TLB and the other levels of the multi-level translation table are updated so that CP and CV bits for both aliases are asserted, and the operating system routine is done 73, so that subsequent accesses to either alias are performed without software intervention. If the operating system guideline has been violated, in step 74 the operating system flushes the OLDALIAS from the first-level virtually indexed cache. Step 75 then deasserts the CV bit for the OLDALIAS, so that the NEWALIAS can exist in the first-level cache 43 while the OLDALIAS must stay in the second-level cache 44. Test 76 determines whether a store to the OLDALIAS in the second-level cache 44 has been dispatched. This test 76 is difficult to perform without hardware support. Thus, an alternative way to implement this uses a common TLB attribute, referred to as the W (writeable) bit. By deasserting the W bit for the OLDALIAS, the operating system can adjust this bit in the appropriate page mapping to prevent stores from occurring to the OLDALIAS. If a store to the OLDALIAS occurs, a software trap is taken because the W bit is deasserted, and the operating system performs the appropriate flushing and attribute adjustment. If a store has been dispatched to the OLDALIAS, the data for the NEWALIAS in the first-level cache 43 is stale, and is therefore flushed from the first-level cache 43 in step 77. At step 78, the CV bit for the NEWALIAS' page is deasserted in the translation table and the TLB, and the CV bit for the OLDALIAS' page is asserted in the translation table and the TLB. This allows the OLDALIAS to exist in the first-level cache 43 while the NEWALIAS is relegated to the second-level cache 44. If test 79 determines that a store to the NEWALIAS in the second-level cache 44 is dispatched, the flow returns to step 74, where the OLDALIAS and NEWALIAS switch positions in the first and second-level caches. As long as test 79 does not detect a store to the NEWALIAS, and test 80 does not detect a re-mapping of either alias, accesses to either alias can proceed without software intervention, because translations for both aliases are in the TLB 41. If test 80 detects a new mapping to either alias, the routine is restarted at 70. Similarly, if test 81 detects a new mapping to either alias while the NEWALIAS is in the first-level cache 41, the routine is restarted at step 70.

Figure 8:
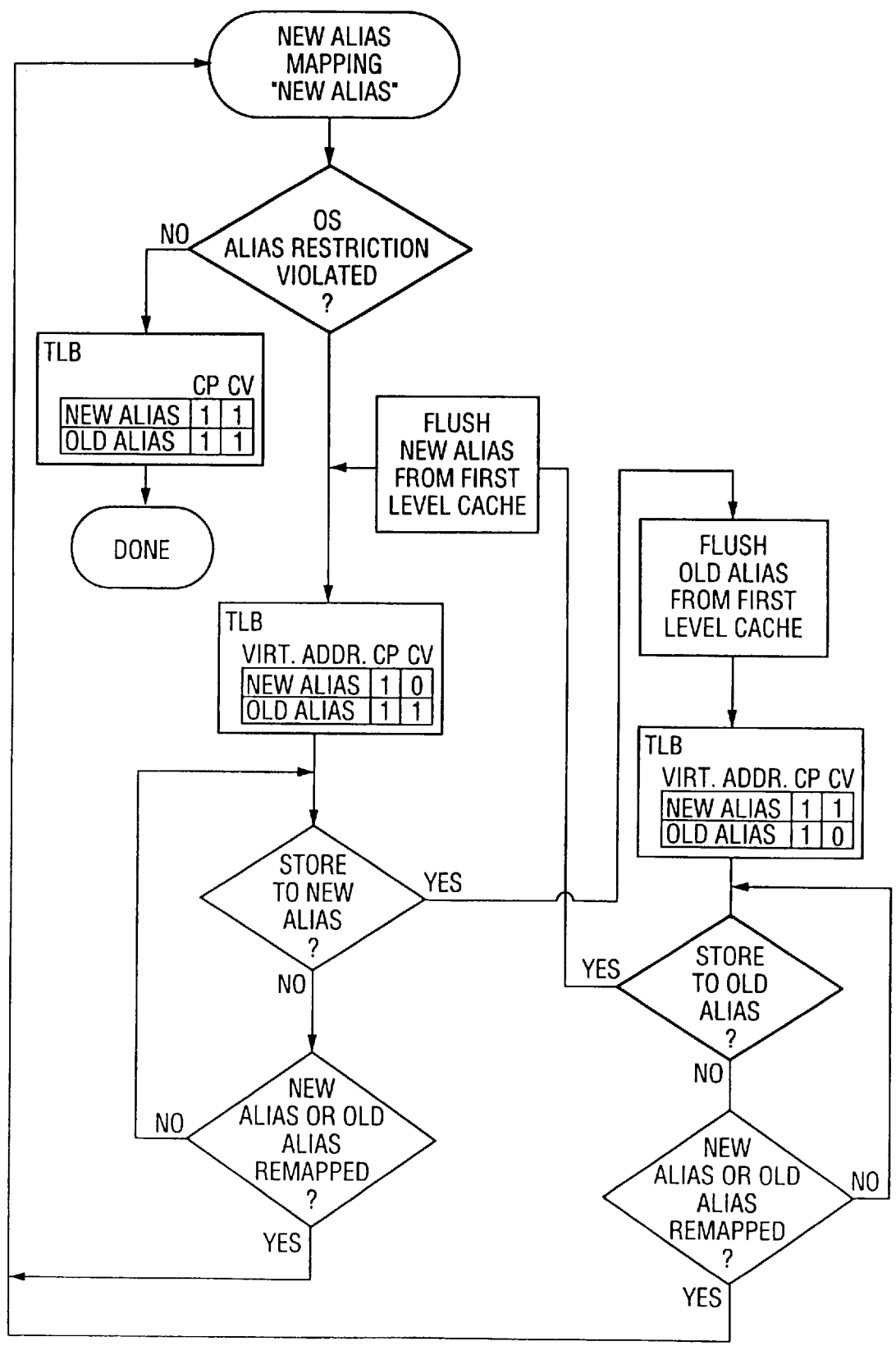
FIG. 8 is a flowchart illustrating the activities of a operating system software routine according to the third embodiment of the present invention.

A third embodiment of the present invention allows the OLDALIAS to remain in the first-level cache when a NEWALIAS is mapped. FIG. 8 shows the operating system flow for the third embodiment. The flow of the operating system software according to this third embodiment is similar to that of the second embodiment. In fact, FIG. 7 is transformed into FIG. 8 by the following alterations. The positions of steps 78 and 75 are interchanged; the positions of steps 77 and 74 are interchanged; the new position of step 77 (position of step 74 in FIG. 7) is moved so that the YES branch of test 71 directly flows to the new position of step 78 (position of step 75 in FIG. 7); and the positions of tests 76 and 79 are interchanged. The fundamental difference in the third embodiment over the second embodiment is that the older alias remains in the first-level cache 43 until a store to the newer alias is performed.

In either the second or the third embodiment, the operating system may choose to interchange the older alias and the newer alias in the first-level cache 43 for additional reasons other than maintaining data consistency in the presence of stores to the alias in the second-level cache 44. In order to guarantee correct program execution, the interchanging of the CV attributes for the aliases is necessary whenever a store to the alias in the second-level cache 44 is performed. However, the operating system may be able to speed execution by interchanging the CV attributes in other situations as well. Even though correct program execution is guaranteed by following the flowchart of FIG. 7, the operating system software might nonetheless choose to switch the OLDALIAS into the first-level cache before a store to the OLDALIAS occurred. For example, this would be a prudent decision if the operating system anticipates that the OLDALIAS will be repeatedly loaded in the near future, so that substantial execution time savings can be realized by taking advantage of the fast first-level cache. In these cases, the test 76 and 79 in FIG. 7 and the corresponding tests in FIG. 8 would consider additional information (other than merely whether or not a store has been dispatched) before deciding which branch to take. The appended claims are intended to cover such obvious variations.

While the method and apparatus of the present invention has been described in terms of its presently preferred embodiments, those skilled in the art will recognize that the present invention may be practiced with modification and alteration within the spirit and scope of the appended claims. Therefore, the specifications and drawings are to be regarded in an illustrative rather than a restrictive sense.

What is claimed is:

1. A method of accommodating a second virtual address mapping to a physical address in a memory system having a first virtual address mapping to the physical address, wherein the memory system has a first-level virtually-indexed cache and a second-level physically-indexed cache, the method comprising the steps of:

invalidating all data corresponding to the first virtual address in the first-level cache;

disabling caching of data corresponding to the first virtual address in the first-level cache;

enabling caching of data corresponding to the first virtual address in the second-level cache, enabling caching of data corresponding to the second virtual address in the second-level cache;

enabling caching of data corresponding to the second virtual address in the first-level cache until a store to the first virtual address occurs;

invalidating all data corresponding to the second virtual address in the first-level cache after a store to the first virtual address occurs;

disabling caching of data corresponding to the second virtual address in the first-level cache after a store to the first virtual address occurs; and enabling caching of data corresponding to the first virtual address in the first-level cache after a store to the first virtual address occurs.

2. A method of accommodating a second virtual address mapping to a physical address in a memory system having a first virtual address mapping to the physical address, wherein the memory system has a first-level virtually-indexed cache and a second-level physically-indexed cache, the method comprising the steps of:

invalidating all data corresponding to the first virtual address in the first-level cache;

disabling caching of data corresponding to the first virtual address in the first-level cache;

enabling caching of data corresponding to the first virtual address in the second-level cache; and enabling caching of data corresponding to the second virtual address in the second-level cache, wherein disabling caching of data corresponding to the first virtual address in the first-level cache is accomplished by deasserting a cacheable-in-virtually-indexed-cache attribute bit for a translation table entry for the first virtual address, wherein enabling caching of data corresponding to the first virtual address in the second-level cache is accomplished by asserting a cacheable-in-physically-indexed-cache attribute bit for a translation table entry for the first virtual address, and wherein enabling caching of data corresponding to the second virtual address in the second-level cache is accomplished by asserting a cacheable-in-physically-indexed-cache attribute bit for a translation table entry for the second virtual address.

3. An apparatus for accommodating a second virtual address mapping to a physical address in a memory system having a first virtual address mapping to the physical address, wherein the memory system has a first-level virtually-indexed cache and a second-level physically-indexed cache, the apparatus comprising:

a first-level cache invalidation circuit for invalidating all data corresponding to the first virtual address in the first-level cache;

a first-level cache disabling circuit for disabling caching of data corresponding to the first virtual address in the first-level cache;

a second-level cache enabling circuit for enabling caching of data corresponding to the first virtual address in the second-level cache, and for enabling caching of data corresponding to the second virtual address in the second-level cache; and a first-level cache enabling circuit for enabling caching of data corresponding to the second virtual address in the first-level cache until a store to the first virtual address occurs, wherein the first-level cache invalidation circuit also invalidates all data corresponding to the second virtual address in the first-level cache after a store to the first virtual address occurs, wherein the first-level cache disabling circuit also disables caching of data corresponding to the second virtual address in the first-level cache after a store to the first virtual address occurs, and wherein the first-level cache enabling circuit also enables caching of data corresponding to the first virtual address in the first-level cache after a store to the first virtual address occurs.

4. An apparatus for accommodating a second virtual address mapping to a physical address in a memory system having a first virtual address mapping to the physical address, wherein the memory system has a first-level virtually-indexed cache and a second-level physically-indexed cache, the apparatus comprising:

a first-level cache invalidation circuit for invalidating all data corresponding to the first virtual address in the first-level cache;

a first-level cache disabling circuit for disabling caching of data corresponding to the first virtual address in the first-level cache; and a second-level cache enabling circuit for enabling caching of data corresponding to the first virtual address in the second-level cache, and for enabling caching of data corresponding to the second virtual address in the second-level cache, wherein the first-level cache disabling circuit disables caching of data corresponding to the first virtual address in the first-level cache by deasserting a cacheable-in-virtually-indexed-cache attribute bit for a translation table entry for the first virtual address, wherein the second-level cache enabling circuit enables caching of data corresponding to the first virtual address in the second-level cache by asserting a cacheable-in-physically-indexed-cache attribute bit for a translation table entry for the first virtual address, and wherein the second-level cache enabling circuit enables caching of data corresponding to the second virtual address in the second-level cache by asserting a cacheable-in-physically-indexed-cache attribute bit for a translation table entry for the second virtual address.

5. A method of accommodating a second virtual address mapping to a physical address in a memory system having a first virtual address mapping to the physical address, wherein the memory system has a first-level virtually-indexed cache and a second-level physically-indexed cache, the method comprising the steps of:

- disabling caching of data corresponding to the second virtual address in the first-level cache;
- enabling caching of data corresponding to the first virtual address in the second-level cache;
- enabling caching of data corresponding to the second virtual address in the second-level cache;
- enabling caching of data corresponding to the first virtual address in the first-level cache until a store to the second virtual address occurs;
- invalidating all data corresponding to the first virtual address in the first-level cache after a store to the second virtual address occurs;
- disabling caching of data corresponding to the first virtual address in the first-level cache after a store to the second virtual address occurs; and
- enabling caching of data corresponding to the second virtual address in the first-level cache after a store to the second virtual address occurs.

6. A method of accommodating a second virtual address mapping to a physical address in a memory system having a first virtual address mapping to the physical address, wherein the memory system has a first-level virtually-indexed cache and a second-level physically-indexed cache, the method comprising the steps of:

- disabling caching of data corresponding to the second virtual address in the first-level cache;
- enabling caching of data corresponding to the first virtual address in the second-level cache; and
- enabling caching of data corresponding to the second virtual address in the second-level cache, wherein disabling caching of data corresponding to the second virtual address in the first-level cache is accomplished by deasserting a cacheable-in-virtually-indexed-cache attribute bit for a translation table entry for the first virtual address, wherein enabling caching of data corresponding to the first virtual address in the second-level cache is accomplished by asserting a cacheable-in-physically-indexed-cache attribute bit for a translation table entry for the first virtual address, and wherein enabling caching of data corresponding to the second virtual address in the second-level cache is accomplished by asserting a cacheable-in-physically-indexed-cache attribute bit for a translation table entry for the second virtual address.

7. An apparatus for accommodating a second virtual address mapping to a physical address in a memory system having a first virtual address mapping to the physical address, wherein the memory system has a first-level virtually-indexed cache and a second-level physically-indexed cache, the apparatus comprising:

- a first-level cache disabling circuit for disabling caching of data corresponding to the second virtual address in the first-level cache;
- a second-level cache enabling circuit for enabling caching of data corresponding to the first virtual address in the second-level cache, and for enabling caching of data corresponding to the second virtual address in the second-level cache; and
- a first-level cache enabling circuit for enabling caching of data corresponding to the first virtual address in the first-level cache until a store to the second virtual address occurs, wherein a first-level cache invalidation circuit also invalidates all data corresponding to the first virtual address in the first-level cache after a store to the second virtual address occurs, wherein the first-level cache disabling circuit also disables caching of data corresponding to the first virtual address in the first-level cache after a store to the second virtual address occurs, and wherein the first-level cache enabling circuit also enables caching of data corresponding to the second virtual address in the first-level cache after a store to the second virtual address occurs.

8. An apparatus for accommodating a second virtual address mapping to a physical address in a memory system having a first virtual address mapping to the physical address, wherein the memory system has a first-level virtually-indexed cache and a second-level physically-indexed cache, the apparatus comprising:

- a first-level cache disabling circuit for disabling caching of data corresponding to the second virtual address in the first-level cache; and
- a second-level cache enabling circuit for enabling caching of data corresponding to the first virtual address in the second-level cache, and for enabling caching of data corresponding to the second virtual address in the second-level cache, wherein the first-level cache disabling circuit disables caching of data corresponding to the second virtual address in the first-level cache by deasserting a cacheable-in-virtually-indexed-cache attribute bit for a translation table entry for the second virtual address, wherein the second-level cache enabling circuit enables caching of data corresponding to the first virtual address in the second-level cache by asserting a cacheable-in-physically-indexed-cache attribute bit for a translation table entry for the first virtual address, and wherein the second-level cache enabling circuit enables caching of data corresponding to the second virtual address in the second-level cache by asserting a cacheable-in-physically-indexed-cache attribute bit for a translation table entry for the second virtual address.

* * * * *